Aug. 17, 1937.  C. L. EKSERGIAN  2,090,193
WHEEL STRUCTURE
Filed May 27, 1932
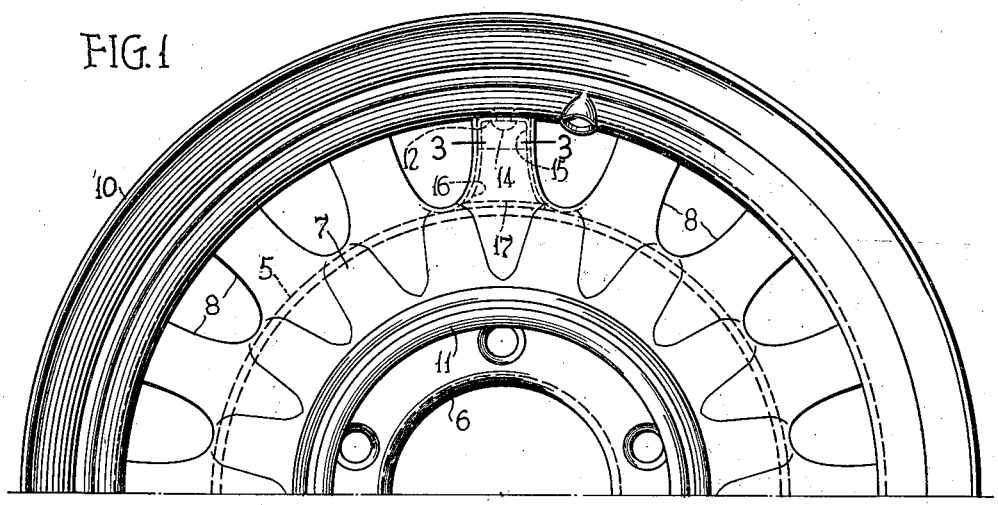
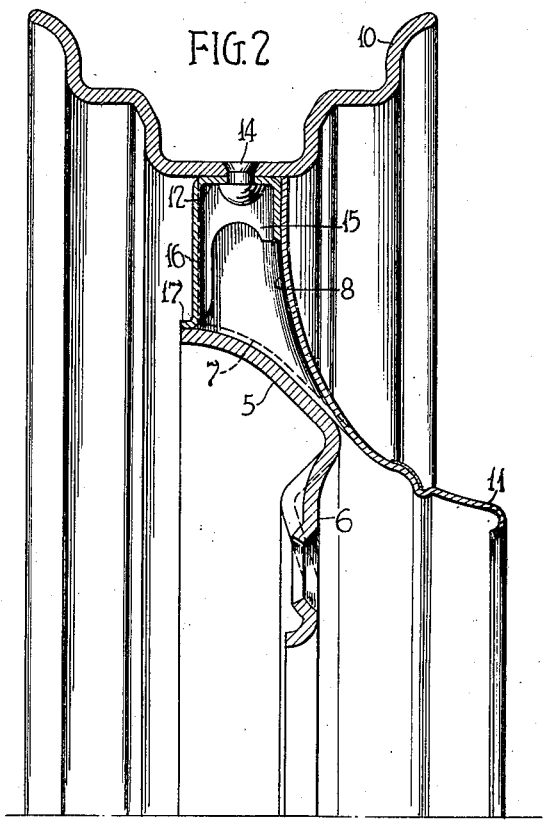
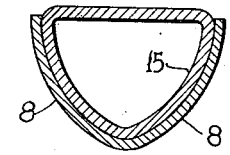
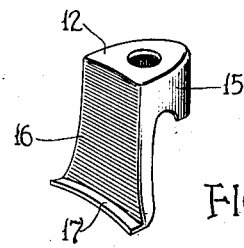
INVENTOR
CAROLUS L. EKSERGIAN
BY
John P. Jacobs
ATTORNEY Patented Aug. 17, 1937

2,090,193

UNITED STATES PATENT OFFICE 2,090,193

WHEEL STRUCTURE

Carolus L. Eksergian, Detroit, Mich., assignor to Budd Wheel Company, Philadelphia, Pa., a corporation of Pennsylvania Application May 27, 1932, Serial No. 613,912

11 Claims. (Cl. 301—64)

My invention relates to wheels and particularly to pressed-metal wheels of the artillery type.

One object of my invention is to close and reinforce the open sides of pressed-metal wheel spokes of channel section, to facilitate assembling and welding the wheel parts, to obtain a wheel of extremely light weight, without sacrificing necessary strength, and to obtain other advantages incident to a utilization of the improvement.

Another object of the invention is to provide a pressed-metal artillery wheel that shall be simple and durable in construction, economical to manufacture and effective in its operation.

A wheel for which this invention is adapted comprises, a conical load-sustaining member or nave having a mounting-plate portion for attachment to a hub flange, as by bolts, a pressed-metal body fitting the outer surface of the nave and having axially-inwardly-opening spokes of channel section, and a pressed-metal rim over the open outer ends of the spokes.

My invention comprises a combined reinforcing and closing member for the open rear sides of a spoke in the form of a sheet-metal stamping. This stamping comprises a portion of substantially cup-shape, the closed bottom wall of which closes the outer end of the spoke and the side walls of which conformingly fit the channel section of the spoke. A radially-inwardly projecting extension of channel section, at one side of the cup, closes the open side of the spoke and has an axial extension on the nave.

The closed end of the cup is preferably riveted to the rim, the side walls of the cup are projection welded to the front or bottom channel, walls of the spoke and spot welded to the channel side walls of the spokes, and the channel section and its axial extension are arc welded to the spoke and to the nave, respectively, as will hereinafter more clearly appear.

Figure 1 of the accompanying drawing is a view, in front-side elevation, of the upper half of a wheel embodying the invention, Figure 2 is an enlarged axial section of the structure shown in Fig. 1, Figure 3 is a detail sectional view, taken substantially along the line 3—3 of Fig. 1, and Figure 4 is a detail perspective view of a new element of the combination shown in the previous figures.

The structure illustrated comprises a relatively heavy-gauge sheet metal stamping, or load-sustaining member, including a conical portion 5 and a mounting-plate portion 6 for attachment to a usual hub flange.

A lighter-guage stamping, preferably of stainless steel, includes a nave portion 7 conformingly fitting the outer side of the load-sustaining portion 5 and having axially-inwardly-opening spokes 8, open at the outer ends, to the rim 10 and, at the inner ends, through the nave portion 7, to the portion 5 which closes the same. It further comprises a portion 11 for receiving a hub cap.

The rim 10, although shown as of the dropcenter type, may be of any suitable type having an inner perimeter closely fitting and closing the outer ends of the spokes.

A device of my invention includes preferably a sheet-metal stamping, shown more clearly in Fig. 4, and including an outer end portion of substantially cup-shape having a bottom, or closed-end, wall 12, perforated only to receive a rivet 14, side walls 15 conforming to the channel-section spoke, see Fig. 3, and an inwardly-projecting radial extension 16 of channel section constituting a closure wall for the rear or open side of the spoke and having an axial extension 17.

Along positions adjacent to the bottom wall, or front side, of the spoke 8, the side walls 15 may be spot or projection welded to the spoke or other fastening means as rivets, may be used. At the side walls of the spoke, the side walls 15 of the closure element of my invention may be spot welded to the spoke. The side walls of the channel section 16 may be spot or arc welded to the inner edges of the spoke and the flange 17 is preferably arc welded to the nave 5 but may be riveted or spot welded to provide a tight structure.

As above constituted, the spoke is completely closed; at the front and sides, by its own walls; at the outer end, by the wall 12 and the rim 10; at the rear, by the portion 16 and at the inner end, by the portion 5 of said load sustaining member. The portion 16 also functions to radially reinforce the spoke, along its open rear side between the rim and the load-sustaining nave, is preferably but not necessarily flat in a plane parallel to the load plane of the wheel and flares laterally and inwardly to conform to the spoke sides.

As distinguished from a similar wheel having an annular member extending across the open sides of, and between, the spokes, the several smaller and individual spoke closures are, in the aggregate, lighter in weight, have the additional functions of securing the spoke sides and closing the spoke ends, are easier to manufacture, handle, assemble and replace, render the wheel of neater appearance, lend strength only where it is needed, and have other advantages.

While I have shown and described a particular form of my invention, changes may be effected therein without departing from the spirit and scope thereof, as set forth in the appended claims.

What I claim is:

1. A wheel comprising a sheet-metal stamping including a nave and a spoke of channel section opening radially through the nave, a load-sustaining member opposite the open inner end of the spoke and a sheet metal member having a rim mounting portion across the outer end of the spoke and a radial portion extending to said load-sustaining member.

2. A wheel comprising a sheet-metal stamping including a nave and a spoke of channel section opening radially through the nave, a load-sustaining member opposite the open inner end of the spoke, and a sheet-metal member secured to the stamping having a portion of hollow section fitting the sides of the spoke adjacent to the outer end thereof and a radial portion extending to said member.

3. A wheel comprising a conical load supporting member, a stamping fitting the outer side of said member and having an axially inwardly opening spoke of channel section open at its inner end adjacent said member and a combined reinforcing and closure member for the spoke including an outer end portion of cup shape having a bottom wall closing the outer end of the spoke, side walls in, and conforming to, the side walls of the spoke and a radial extension of channel section closing the open side of the spoke and having an axial flange on the load supporting member.

4. A vehicle wheel comprising, in combination, a main load sustaining member including a radially extending bolting on flange and a conically extending hub shell portion, a wheel body member including spokes of open U-section facing axially, and a conically extending unitary nave and hub shell portion, said nave portion including conically extending web portions interconnecting the roots of the spokes and complementally fitting the hub shell portion of said load sustaining member, and pressed metal members closing the open sides and outer ends of said spokes and being in secured relation to said rim and said wheel body member, and each having an axially extending flange portion adapted for complemental fit to a corresponding portion of said load sustaining member and being in secured relation thereto.

5. The wheel as defined in claim 4 wherein hub shell portions of said wheel body and load sustaining members extend substantially oppositely from said radially extending bolting on flange in complemental conical continuity.

6. A wheel comprising in combination a rim, a sheet metal stamping including a nave and spokes of channel section opening radially through the nave, a load sustaining member opposite the open inner ends of the spokes including a bolting on flange, a plurality of sheet metal members, each of said members having a rim mounting portion closing the outer end of a spoke and a radially extending portion closing the open side of a spoke and extending to said load sustaining member, and means connecting said sheet metal members to said rim and to said sheet metal stamping.

7. A wheel comprising a sheet metal stamping including spokes of channel section, and a plurality of sheet metal members each having radially extending sides and an axially outwardly extending end portion respectively closing the open side and outer end of a spoke, and each having also an axially extending hub shell portion.

8. A wheel comprising a sheet metal stamping including spokes of channel section, and a plurality of sheet metal members each having radially extending sides and an axially extending end portion respectively closing the open side and outer end of a spoke, and each having also an axially extending hub shell portion, certain of said radial extending sides being in the form of axially outwardly extending flanges.

9. A wheel comprising a sheet metal stamping including a spoke of channel section, and a sheet metal member secured to the stamping having a rim mounting portion across the outer end of the spoke and a radial portion closing the open side of the spoke, said sheet metal member having its radial portion flanged axially outwardly and its main body substantially flush with the inner edges of the channel section.

10. An artillery wheel comprising inner and outer stampings, said inner stamping having a central mounting portion for attachment to a hub, said mounting portion forming the sole means for assuming all the wheel load, said outer stamping being carried by said inner stamping and having a nave extending generally axially outwardly of said mounting portion in spaced relation to said mounting portion and the hub, means upon said nave for carrying a hub cap in spaced relation to the hub, channel section spokes projecting outwardly from and formed integrally with said nave, and means integrally connected with the inner stamping combining with the spokes of said outer stamping to close the same and provide at their outer ends closures for the outer ends of said spokes.

11. An artillery wheel comprising a hub member, a rim member, and a wheel body having inner and outer pressed metal parts each having a central portion and spoke portions radiating from said central portion, said spoke portions being axially opposite and in secured relation to each other, said inner part having its central portion connected to the hub member and its spoke portions connected to the rim member, said outer part having its central portion extending generally axially from the central portion of said inner member and in spaced relation thereto, and also to said hub member, the spoke portions of said parts combining to form spokes of hollow section and the spoke portions of one of said parts having axially-extending portions closing the outer ends of the spokes.

CAROLUS L. EKSERGIAN.